Sept. 15, 1931.  P. L. TENNEY  1,823,432

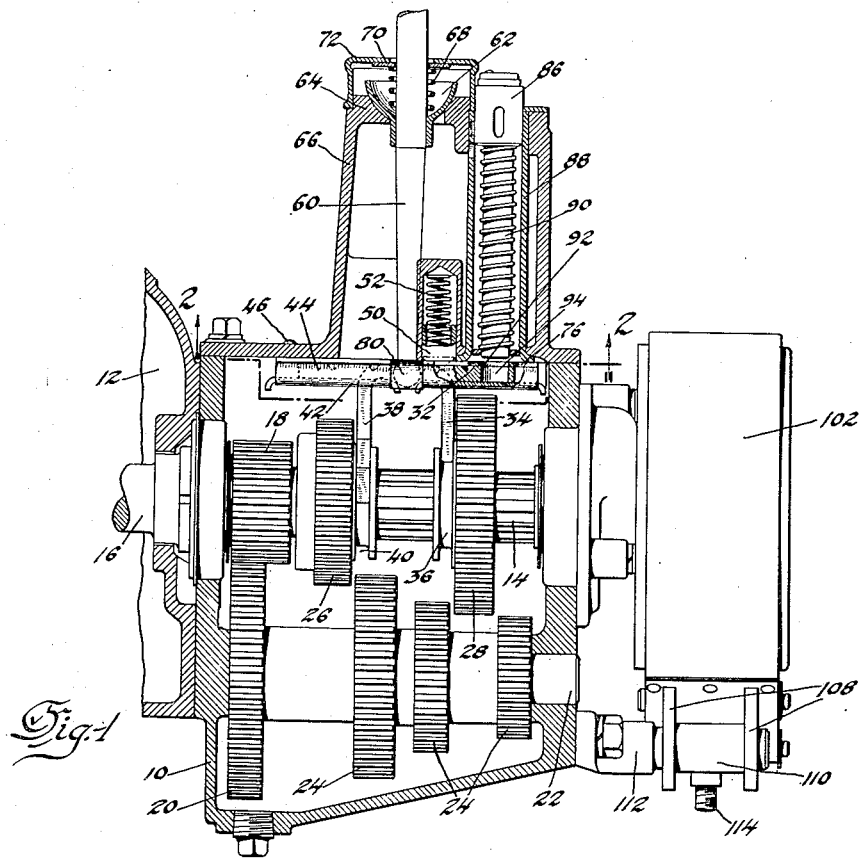

TRANSMISSION

Filed May 7, 1923  2 Sheets-Sheet 2

Inventor
Perry L. Tenney
By his Attorneys

Patented Sept. 15, 1931

1,823,432

UNITED STATES PATENT OFFICE

PERRY L. TENNEY, OF MUNCIE, INDIANA, ASSIGNOR TO GENERAL MOTORS CORPORATION, OF DETROIT, MICHIGAN, A CORPORATION OF DELAWARE

TRANSMISSION

Application filed May 7, 1923. Serial No. 637,230.

This invention relates to transmissions and is illustrated as embodied in the gear shifting mechanism of a transmission for an automobile. An object of the invention is to provide inexpensive and readily assembled gear shifting devices which operate positively and a compact arrangement of the braking mechanism.

One important feature of the invention relates to providing gear shifting devices which can be stamped or bent from heavy sheet metal with a minimum of machining, by arranging the sliding gears to be operated by shifter forks, each of which has a vertical operating portion and a slidably supported horizontal portion. In one desirable arrangement the horizontal portions are supported by a plate which is attached to the top of the transmission casing along its edges and which may have an opening suitably formed to permit passage of the vertical portions of the shifter forks.

Another feature of the invention relates to an improved interlocking device which is positively operated and which, while not necessarily limited to such use, is especially well adapted to cooperate with the above described slidably supported shifter forks. In the preferred form, this interlocking device comprises a member which is moved transversely by transverse movement of the gear shifting lever and which has parts operated by such transverse movement to interlock with the idle shifter fork positively to prevent it from moving. In the illustrated embodiment of the invention this member is in the form of a slidable plate having a slot embracing the gear shifting lever, and which has a pair of down turned lugs on its opposite sides so arranged that one of them is moved by the lever into a notch in the outer edge of the idle shifter fork.

From a somewhat different point of view the invention contemplates the provision in a transmission of this type of a simple but highly efficient arrangement of transmission lock, in combination with the gear shifting devices, in such a manner that one shifter fork is locked directly while the other fork is locked indirectly through the medium of an interlocking device such as the slidable plate described above. In the arrangement shown in the drawings, one of the shifter forks is provided with an opening which registers with an opening in the interlocking plate when the plate is in such a position as to lock the opposite shifter fork, and a key-controlled lock is arranged so that its bolt can be projected into the registered openings to lock the mechanism as described.

Other features of the invention relate to a novel mounting for the gear shifting lever, to a protection for the lock by enclosing it in a hardened steel sleeve, to an efficient and compact arrangement of a transmission brake, and to other novel combinations of parts and desirable particular constructions which will be apparent from the following description of the illustrative embodiment of my invention shown in the accompanying drawings, in which:

Figure 1 is a view partly in longitudinal vertical section and partly in side elevation showing the improved gear shifting and brake mechanisms in operative relation to the transmission gears;

Figure 2 is a section on the line 2—2 of Figure 1 showing some of the parts of the gear shifting mechanism in horizontal section and other parts in bottom plan;

Figure 3:
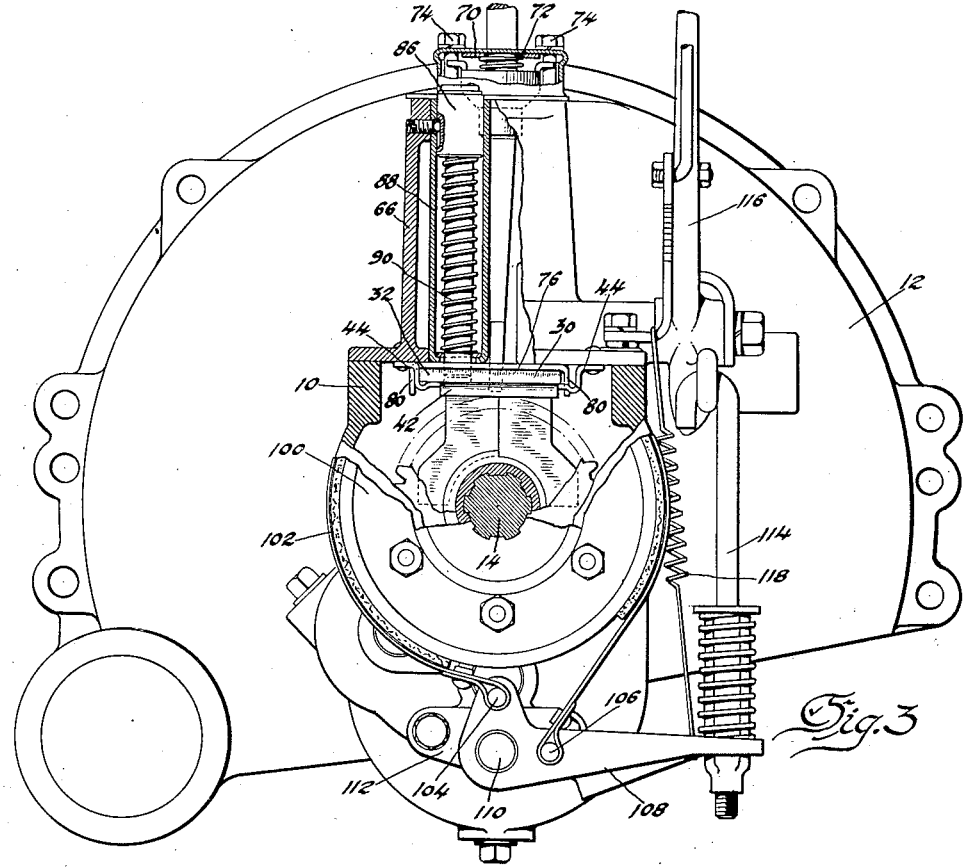
Figure 3 is a view partly in end elevation and partly in transverse vertical section showing the arrangement of the key-controlled lock and the transmission brake.

In the form shown in the drawings the transmission is enclosed in a transmission casing 10 having a clutch housing 12 at one end and in which are arranged in the usual manner a splined driven shaft 14 which is arranged coaxially of a drive shaft 16, there being a gear 18 on the drive shaft 16 meshing with a gear 20 on a counter shaft 22. The counter shaft is provided with gears 24 and the drive shaft 14 is provided with a gear 26 which is axially movable to provide intermediate and high speeds and with a second gear 28 which is axially movable to provide low speed and reverse.

According to the present invention the gears 26 and 28 are controlled by shifter forks 30 and 32, the fork 30 having a vertically extending portion 34 seated in an annular groove 36 formed on gear 28, while the shifter fork 32 has a similar vertically extending portion 38 which seats in an annular groove 40 in a part of gear 26. Each of the forks also has a horizontal portion which is slidably supported by a supporting plate 42 which is turned upwardly at its edges to provide flanges 44 attached to the top of the transmission casing in any suitable manner as by means of bolts or rivets 46. The horizontal portion of each of the shifter forks is provided with three conical depressions 48 arranged to be engaged by the end of a pin 50 urged toward its lowest position by a spring 52 (Figure 1). The pin for each of the shifter forks cooperates with the depressions to determine the neutral and two extreme positions of the fork. As will be apparent from Figures 2 and 4, the plate 42 is spaced from the top of the transmission casing throughout its central portion and this portion is provided with an opening 54, which permits movement of the vertical portions 34 and 38 of the shifter forks.

The horizontal portions of the shifter forks are provided with notches 56 and 58 which are in alinement with each other when the shifter forks are both in neutral position, and which receive the lower rounded end of a vertically extending gear shifting lever 60 which is supported in such a manner that it can be rocked transversely to move the lower end from the one notch into the other, and which can be rocked longitudinally to operate either one of the shifter forks by sliding its horizontal portion along the central portion of the supporting plate 42. In order to permit such movement of lever 60, it carries a semi-spherical sheet metal ball member 62 which forms a ball-and-socket joint with a conical seat formed in a horizontal web 64 of an upwardly extending portion 66 of the cover of the transmission casing 10. Member 62 is held against its seat by a compression spring 68 confined between the semi-spherical member 62 and a washer 70 slidably engaging the lower surface of the top of a perforated cap 72, which is secured to the top of portion 66 by means of screws 74 or in any other suitable manner.

Figure 4:
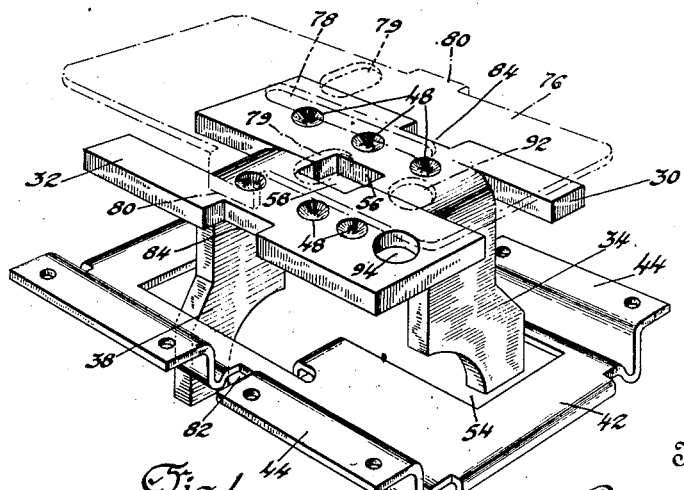
Figure 4 is an exploded perspective view showing some of the parts of the gear shifting mechanism.

According to an important feature of the invention, there is arranged between the horizontal portions of the shifter forks and the lower surface of the top of the transmission casing an interlocking plate 76 shown in dot and dash lines in Figure 4 and in its assembled relation in the other views. This interlocking plate has a longitudinally extending central slot 78 which embraces the lower end of the gear shifting lever 60 in such a manner that the plate is moved transversely by transverse movement of the lever but is not affected by longitudinal movement of the lever. The plate 76 is also provided with transversely extending slots 79 for the passage of the spring pressed pins 50. The opposite edges of the interlocking plate have down-turned lugs 80, which pass through slots 82 formed in the flanges 44 of the supporting plate, and which are spaced from each other on opposite sides of the interlocking plate 76 at such a distance that transverse movement of lever 60 operates to move that one of the lugs 80 which is on the side of the interlocking plate toward which the lever is moving out of its interlocking notch 84 (one of which is formed in the outside edge of the horizontal portion of each of the shifter forks) while at the same time the opposite lug 80 is moved into its notch 84 positively to prevent movement of the idle shifter fork. By this arrangement when the lever is rocked transversely to move it from notch 58 into notch 56 or vice versa, the active shifter fork will be unlocked by movement of the lever while the idle shifter fork will be positively locked by interengagement of its notch 84 with the corresponding lug 80.

The invention also contemplates locking the transmission by a key-controlled lock 86 of any desired form, which is protected against tampering by being housed in a hardened steel sleeve 88, and which has a bolt 90 arranged to be projected into an opening 92 in the interlocking plate 76 and an opening 94 in the shifter fork 32 when these openings register with each other. It will be observed that, before the transmission can be locked, it is necessary to rock the lever 60 to bring its lower end into the notch 58, thus moving the interlocking plate 76 in such a manner as to interlock with the shifter fork 30, and at the same time to register the openings 92 and 94. Thus, after the lock has been manipulated to project the bolt 90 downwardly, the shifter fork 32 is directly locked by the bolt, and the shifter fork 30 is indirectly locked by the bolt through the medium of the interlocking plate 76.

At the end of the transmission casing opposite the clutch housing 12 a brake drum 100 is keyed to the driven shaft 14, and is surrounded by a contractable brake band 102 faced with friction material and having bifurcated ends secured to cross pins 104 and 106 carried by bell crank levers 108 pivoted at 100 on a bracket 112 secured to the transmission casing. The operating arms of the bell crank levers 108 extend transversely beyond the drum 100 and are connected or bridged at their outer ends by a part (which may be integral with the lever if desired) through which passes the lower end of an operating link 114 connected at its upper end to a rearwardly extending arm of a bell crank lever 116, which may be the usual emergency brake operating lever. The bell crank levers 108 are urged toward their upper or idle positions by a spring 118. Manipulation of the emergency brake lever 116 to rock the bell crank levers 108 in a clockwise direction contracts the band 102 to exert a braking force on the shaft 14 through the drum 100.

While one illustrative embodiment of my invention has been described in detail it is not my intention to limit its scope to that embodiment or otherwise than by the terms of the appended claims.

I claim:

1. A transmission comprising, in combination, a transmission casing, a supporting plate secured to and spaced from the top of the casing, a pair of shifter forks having portions slidably supported between the plate and the transmission casing, an interlocking plate between the shifter forks and the casing which is constructed and arranged to prevent movement of both of the shifter forks at once, and an operating lever supported by the casing and arranged to operate the interlocking plate and either of the shifter forks.

2. A transmission comprising, in combination, a transmission casing, a supporting plate secured to and spaced from the top of the casing, a pair of shifter forks having portions slidably arranged side by side on the supporting plate, said portions having notches which are alined with each other when the forks are in neutral position, an operating lever arranged to be rocked transversely from the one notch to the other when the forks are in neutral position and to be rocked in another direction to operate either one of the forks, and an interlocking plate operated by transverse movement of the lever to engage the idle fork to prevent it from moving.

3. A transmission comprising, in combination, a transmission casing, a supporting plate secured to and spaced from the top of the casing, a pair of shifter forks having operating portions extending downwardly through an opening in the plate and having supporting portions slidably resting on the plate, said supporting portions having adjacent notches which are in alinement when the forks are in neutral position and having other notches in their outer edges, an operating lever arranged to be moved transversely from one of the alined notches into the other for operating either of the shifter forks, and an interlocking plate having a slot engaging the lever to be moved by its transverse movement and also having a pair of down-turned locking lugs on its opposite edges so arranged that one of the lugs is moved into the notch in the edge of the idle shifter fork by transverse movement of the lever.

4. A transmission casing comprising, in combination, a supporting plate secured to and spaced from the top of the casing, a pair of shifter forks slidably supported by the plate, and an operating lever constructed and arranged to operate either one of the shifter forks.

5. A transmission comprising, in combination, a transmission casing, a supporting plate secured to the top of the casing along its opposite edges and spaced from the casing in its central portion and having an opening in said central portion, and a pair of slidable shifter forks having vertical portions extending through said opening and having horizontal portions slidably supported between the central portion of the plate and the top of the casing.

6. A transmission comprising, in combination, a transmission casing, a supporting plate secured to the casing at its opposite edges and spaced downwardly from the casing throughout its central portion and having an opening in said central portion, a pair of shifter forks each of which has a vertical operating portion extending through said opening and a horizontal supporting portion slidably resting on the central portion of the supporting plate, there being notches in the adjacent edges of the horizontal portions of the shifter forks which are in alinement with each other when the forks are in neutral position, and an operating lever which is transversely movable to pass from the one notch to the other.

7. A transmission comprising, in combination, a transmission casing, a supporting plate which is U-shaped in transverse cross section to form flanges along opposite edges which are attached to the casing with the central portion of the plate spaced from the casing, and gear shifting mechanism including parts slidably supported between the central portion of the plate and the top of the casing.

8. In a transmission device, a housing, gears within said housing, forks for shifting said gears, said forks being mounted for longitudinal sliding movement, each fork having a first notch, a lever mounted for movement into a selected one of said first notches and also mounted to move said forks, a plate positioned within said housing and having arms projecting from its plane, each of said forks having a second notch to be engaged by one of said arms when the lever is radially moved to engage within a first notch of the other fork, said plate being positioned above said forks and having two downwardly directed arms.

9. In a gear shifting device, a housing, a supporting plate spaced from the top of said housing, a pair of gear shifting members each formed as a sheet metal plate slidably on said supporting plate and guided thereby for longitudinal movement.

10. The invention defined by claim 9, said shifting members engaging each other at their adjacent longitudinal edges, said edges having notches for engagement with the shifting lever.

11. The invention defined by claim 9, said shifting members having notches on their remote longitudinal edges and interlocking means for alternately engaging said notches.

12. In a gear shifting device, a sheet-metal supporting plate, sheet metal members slidably mounted upon said supporting plate and provided with forks extending through said plate, a sheet metal interlocking plate positioned above said fork carrying members and mounted for transverse movement only and having means to engage and lock the idle fork.

13. The invention defined by claim 12 said last named means consisting of lugs extending from the plane of said interlocking plate and positioned to engage one or another of said fork carrying members.

14. The invention defined by claim 12 said last named means consisting of lugs projecting downwardly from the remote longitudinal edges of said interlocking plate and engaging notches in said supporting plate whereby said interlocking plate is at all times restrained from longitudinal movement, said lugs also positioned for engaging one or another of said fork members when the other fork is being shifted.

15. The combination with a transmission housing of a cover therefor, a supporting plate secured to the lower part of said cover, shifting plates slidably supported upon said supporting plate, and each having a lever engaging notch, a fork carried by each shifting plate, and a lever eccentrically mounted with respect to said cover for engaging the notches in said shifter plates.

In testimony whereof I affix my signature.

PERRY L. TENNEY.